(12) United States Patent
Liu et al.

(10) Patent No.: US 7,883,557 B2
(45) Date of Patent: Feb. 8, 2011

(54) SLURRY FOR CHEMICAL-MECHANICAL PLANARIZATION OF SAPPHIRE AND METHOD FOR MANUFACTURING THE SAME

(76) Inventors: Yuling Liu, No. 8, Guangrong Dao, Hebei District, Tianjin (CN) 300130; Bomei Tan, No. 8, Guangrong Dao, Hebei District, Tianjin (CN) 300130; Jianwei Zhou, No. 8, Guangrong Dao, Hebei District, Tianjin (CN) 300130; Xinhuan Niu, No. 8, Guangrong Dao, Hebei District, Tianjin (CN) 300130; Shengli Wang, No. 8, Guangrong Dao, Hebei District, Tianjin (CN) 300130; Jingye Kang, No. 8, Guangrong Dao, Hebei District, Tianjin (CN) 300130; Wei Zhang, No. 8, Guangrong Dao, Hebei District, Tianjin (CN) 300130

( * ) Notice: Subject to any disclaimer, the term of this patent is extended or adjusted under 35 U.S.C. 154(b) by 545 days.

(21) Appl. No.: 11/753,224

(22) Filed: May 24, 2007

(65) Prior Publication Data

US 2007/0278447 A1   Dec. 6, 2007

(30) Foreign Application Priority Data

Jun. 6, 2006   (CN) .......................... 2006 1 0014061

(51) Int. Cl.
*B24D 3/02* (2006.01)
*C09C 1/68* (2006.01)
*C09K 3/14* (2006.01)

(52) U.S. Cl. .......................... 51/309; 252/79.1; 252/79.5
(58) Field of Classification Search ................ 252/79.1, 252/79.5; 51/308, 309
See application file for complete search history.

(56) References Cited

U.S. PATENT DOCUMENTS 7,456,107 B2 *  11/2008  Keleher et al. .............. 438/692

* cited by examiner

*Primary Examiner*—Roberts Culbert
(74) *Attorney, Agent, or Firm*—Matthias Scholl P.C.; Matthias Scholl

(57) ABSTRACT

Taught herein is an aqueous chemical-mechanical polishing slurry, a method for manufacturing the same, and a method for using the same in the preparation of high precision finishing of a sapphire surface. The slurry comprises a chelating agent having 13 chelate rings, a strong propensity for complexation with aluminum ions and for forming a water-soluble chelate product. The removal rate can reach 10-16 μm/h, and the roughness can be reduced to 0.1 nm. The slurry components and their weight percentages are as follows: silica sol from about 1 wt. % to about 90 wt. %, alkali modifier from about 0.25 wt. % to about 5 wt. %, ether-alcohol activator from 0.5 wt. % to about 10 wt. %, chelating agent from about 1.25 wt. % to about 15 wt. %, and deionized water. Using such a slurry, high precision finishing of a sapphire surface can be achieved under relevant polishing conditions, which can satisfy the finishing requirements for industrial sapphire substrate. The slurry has the advantages of low cost, low roughness, and high removal rates, and it does not pollute the environment or damage the etching equipment.

6 Claims, No Drawings

SLURRY FOR CHEMICAL-MECHANICAL PLANARIZATION OF SAPPHIRE AND METHOD FOR MANUFACTURING THE SAME

CROSS-REFERENCE TO RELATED APPLICATIONS

Pursuant to 35 U.S.C. §119 and the Paris Convention Treaty, this application claims the benefit of Chinese Patent Application No. 200610014061.9 filed Jun. 6, 2006, the contents of which are incorporated herein by reference.

BACKGROUND OF THE INVENTION

1. Technical Field

This invention relates to chemical-mechanical planarization (CMP) of sapphire, and, more particularly, to a slurry for chemical-mechanical planarization of sapphire and to a method for preparing the same.

2. Background of the Invention

Single crystal sapphire ($\alpha$-$Al_2O_3$) possesses a unique combination of excellent optical, physical and chemical properties. The hardest of the oxide crystals—measuring 9 on the Mohs' scale of hardness—sapphire retains its high strength at high temperatures, has good thermal and electrical properties and excellent transparency. It is chemically resistant to common acids and alkali at temperatures of up to 1000° C. However, it is difficult to process by processes such as etching and device separation using mechanical cutting or scribing due to its high chemical and thermal stability, and hardness.

The excellent optical, physical and chemical properties of sapphire encourage its wide use in hostile environments where optical transmission in the range from the vacuum ultraviolet to the near infrared is required. Accordingly, sapphire is the material of choice in a variety of modern hi-tech applications, including space and military optical systems, high-power laser optics, and high-pressure components. Sapphire is an anisotropic hexagonal crystal, and its properties depend on the crystallographic direction (relative to the optical C-axis).

Gallium nitride (GaN) is regarded as the third generation semiconductor material, after silicon (Si) and gallium arsenide (GaAs), and it has been used in semiconductor components since the 1990's. However, it is difficult to form GaN into crystalline material, and to be a useful semiconductor, it must be grown as a film on other substrates, such as, e.g., on $Al_2O_3$, SiC, Si, MgO, or ZnO. Sapphire is the foremost substrate material for crystallizing GaN. At present, GaN can be epitaxied on a sapphire substrate to produce GaN-based blue LEDs and LDs.

It is well known that device quality depends to a great extent on the surface machining quality of the substrate. Precision finishing technology for sapphire substrate for GaN growth is an especially difficult problem, and much of present research focuses thereon. Although a super-smooth crystal surface is required, sapphire is difficult to machine process because of its high hardness and brittleness. With the rapid development of optoelectronic technology, the demand for sapphire substrate material for optoelectronic products has increased significantly. In order to meet the demand, the mechanism, technology, and the selection of materials for sapphire polishing has become a very important issue.

Conventional technology for batch machining sapphire is not yet sufficiently well developed. When producing sapphire wafers, the percentage of wafers with cracks and edge damage is quite high and ranges form 5 to 8%. In addition, twenty percent of processed wafers require reworking due to serious surface scratches caused by polishing and grinding steps. Because partial rework wafers can't be used in many applications, this leads to an increased material cost. During the grinding and polishing steps, the polishing and grinding rate is also very low, (1-5 μm/h).

Conventional slurries used for chemical-mechanical planarization of sapphire consist mostly of $Al_2O_3$, which has high hardness and strong mechanical action. However, using $Al_2O_3$ often produces undesirable scratches and other defects. Accordingly, there is much room for improvement in the area of chemical-mechanical polishing of sapphire as related to surface smoothness, processing speed, and cost.

BRIEF SUMMARY OF THE INVENTION

In one aspect, this invention provides for improving the process of chemical-mechanical planarization of sapphire by optimizing the chemical action and reducing the mechanical action of the slurry used in the process.

Specifically, in one embodiment of this invention provided is a slurry for chemical-mechanical planarization of sapphire, the slurry comprising by weight thereof: (1) silica sol 1-90%; (2) an alkali conditioner 1.5-20%; (3) an ether alcohol activator 0.5-10%; and (4) deionized water 8-69%.

In certain embodiments of the invention, the silica sol has a particle size of 15-40 nm and a particle concentration of 1-50% by weight. This is to say that there is from 1-50% by weight of solid silica particles suspended in a medium, such as water, with respect to the weight of the silica sol.

In certain embodiments of the invention, the alkali conditioner comprises: (1) potassium hydroxide (KOH); and (2) a tertiary amine polyol, i.e., an organic compound having at least one tertiary amine functionality ($NR_3$) and a plurality of hydroxyl groups (—OH), such as, without limitation, an EDTA salt formed with 4 equivalents of 3,4-diaminobutane-1,1,2,2-tetraol, also referred to herein as EDTA·4 3,4-diaminobutane-1,1,2,2-tetraol, of the Formula I:

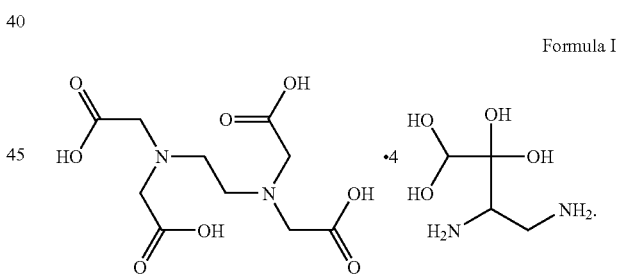

Formula I

In certain embodiments of the invention, the ether alcohol activator is one of the following alkylphenol ethoxylates and polyoxyethylene ethers: a compound of Formula II,

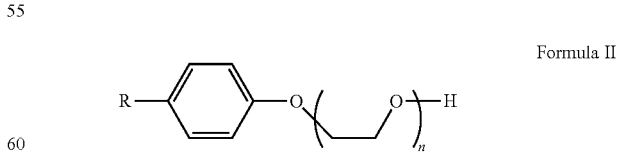

Formula II wherein R is an alkyl e.g., a decyl, and n is an integer greater than about 5, (also referred to herein as "FA/O I", purchased from Tianjin Jingling Microelectronic Materials Limited company under the brand name FA/O I surfactant); $C_{10}H_{21}$—$C_6H_4$—O—$(CH_2CH_2O)_7$—H (also referred to herein as "$O_{II}$-7"); $C_{10}H_{21}$—$C_6H_4$—O—$(CH_2CH_2O)_{10}$—H (also referred to herein as "$O_{II}$-10"); $C_{12-18}H_{25-37}$—O—$(CH_2CH_2O)_{20}$—H (also referred to herein as "O-20"); $C_{12-18}H_{25-37}$—O—$(CH_2CH_2O)_{15}$—H (also referred to herein as "OS15"); or a mixture of or more thereof.

In other aspects, this invention provides a method for manufacturing a slurry for chemical-mechanical planarization of sapphire comprising the steps of: (1) diluting silica sol using deionized water, wherein the content of deionized water is 0-60% by weight; (2) adjusting the pH value to between 9 and 13.5 with a pH conditioner; and (3) adding 0.5-10% by weight of an ether alcohol activator.

DETAILED DESCRIPTION OF THE INVENTION

The invention includes the following advantages:
1. The alkali conditioner in the slurry insures a stable state of the nano-sized silica sol.
2. The alkali conditioner for the slurry is a mixture of KOH with EDTA·4 3,4-diaminobutane-1,1,2,2-tetraol of Formula I, Formula I

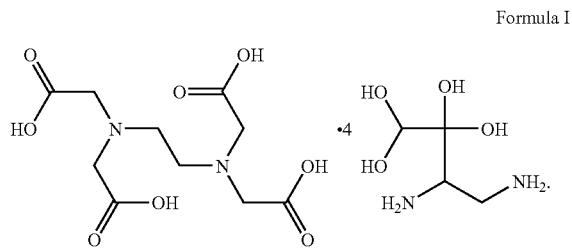

The alkali conditioner acts as a buffer and an abrasive stabilizer, and it can produce a water-soluble large-molecule product. This allows the reaction product to break away from the finishing surface under relatively-weak mechanical action. The alkali conditioner also act as a complexing and chelating agent, achieving a beneficial combination of polishing attributes while reducing the cost.

3. According to the properties of sapphire material ($\alpha$-$Al_2O_3$), chemical treatments with both acid and alkali would be required to achieve good polishing results, but acids adversely affect abrasive stability and etching equipment. Therefore, the alkali medium is selected.

4. The surfactant in the slurry improves the height selection ratio, effectively reduces the surface tension, decreases the extent of damage to the treated surface, enhances the stability of the nano-sized silica sol in the slurry, improves mass transfer rate, and enhances the transport process, all of which contribute to a finished surface that is highly flat, smooth, and easy to clean.

5. The alkali slurry protects the equipment from corrosion and provides for a good stability of the silica sol. It is easy to gel and eliminates pollution. It is amphoteric and at pH values above 9 produces a soluble complex with the removed material which is easily separated from the polishing surface.

6. The nano-sized silica sol in the slurry is used as an abrasive, which has the properties of small particle size (15-25 nm), high concentration (>40 wt %), low hardness, and a good degree of dispersion. This improves the consistency of the finished surfaces and helps to realize high removal rates and low damage during polishing. It overcomes the shortcomings associated with the high hardness and propensity for creating scratches of $Al_2O_3$. The slurry is also easy to deposit.

7. The potassium hydroxide is selected as a base, which reacts with the finishing material quickly and provides enhanced chemical action.

The following characteristics are associated with conventional chemical-mechanical polishing: (1) removal rate 1-5 μm/h; (2) surface roughness 0.1-1 nm; (3) flatness lower than 0.5 μm/φ75 mm. The following characteristics are associated with the methods according to this invention: (1) removal rate 10-18 μm/h; (2) surface roughness 0.1-0.3 nm.

The invention will now be described in more detail with respect to the following, specific, non-limiting examples.

EXAMPLES

The following 5 examples (1-5) give the components and weight percentages of slurry components of five different slurries according the invention.

| | Abrasive (Silica sol) | Alkali conditioner | Ether alcohol activator | Deionized water |
|---|---|---|---|---|
| 1 | Concentration - 50%, particle size - 30-40 nm, weight - 40 g | KOH solution (440 g), EDTA·4 3,4-diaminobutane-1,1,2,2-tetraol (720 g) | FA/O I surfactant 400 g | 3000 g |
| 2 | Concentration - 50%, particle size - 30-40 nm, weight - 40 g | KOH solution (224 g), EDTA·4 3,4-diaminobutane-1,1,2,2-tetraol (154 g) | FA/O I surfactant 32 g | 1800 g |
| 3 | Concentration - 30%, particle size - 25-30 nm, weight - 3600 g | KOH solution (120 g), EDTA·4 3,4-diaminobutane-1,1,2,2-tetraol (90 g) | FA/O I surfactant 10 g | 280 g |
| 4 | Concentration - 20%, particle size - 20-30 nm, weight - 800 g | KOH solution (240 g), EDTA·4 3,4-diaminobutane-1,1,2,2-tetraol (200 g) | $O_{II}$-7, 200 g | 2600 g |

-continued

| | Abrasive (Silica sol) | Alkali conditioner | Ether alcohol activator | Deionized water |
|---|---|---|---|---|
| 5 | Concentration - 5%, particle size - 30-40 nm, weight - 2000 g | KOH solution (224 g), EDTA·4 3,4-diaminobutane-1,1,2,2-tetraol (154 g) | OII-10, 32 g | 1800 g |

With reference to Example 4, the slurry is manufactured as follows. 800 g of 15-25 nm silica sol are added to 2400 g deionized water while stirring. 40 g potassium hydroxide dissolved in 200 g deionized water is further added thereto, followed by addition of 200 g of EDTA·4 3,4-diaminobutane-1,1,2,2-tetraol, and 200 g of $C_{10}H_{21}$—$C_6H_4$—O—$(CH_2CH_2O)_7$—H. 4040 g of slurry is obtained as a result.

What is claimed is:

1. A method for manufacturing a slurry for chemical-mechanical planarization comprising silica sol, alkali conditioner, ether alcohol activator, and deionized water, comprising the following steps:
   (a) suspending said silica sol having a particle size of silica of between 15 nm and 25 nm in deionized water, wherein said deionized water is provided in a weight ratio of between 0% and 60% with respect to said silica sol;
   (b) adding said alkali conditioner until the pH of the suspension is in the range of from about 9 to about 13.5; and
   (c) adding said ether alcohol activator in a weight ratio of from about 0.5% to about 10% with respect to the weight of the slurry,
   wherein said alkali conditioner comprises a tertiary amine polyol.

2. The method of claim 1, wherein said silica sol comprises silica particles at a concentration of from about 1% to about 50% by weight with respect to the weight of the silica sol; and said silica particles have a size ranging from about 15 nm to about 40 nm.

3. The method of claim 1, wherein said tertiary amine polyol is EDTA·4 3,4-diaminobutane-1,1,2,2-tetraol of Formula I

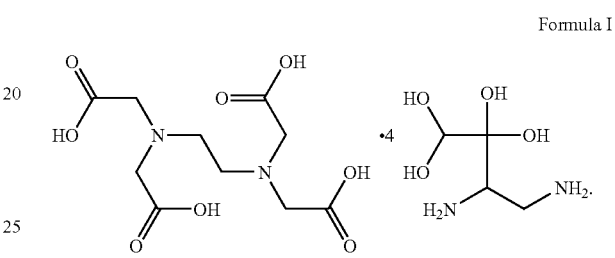

Formula I

4. The method of claim 1, wherein said alkali conditioner further comprises potassium hydroxide.

5. The method of claim 1, wherein said ether alcohols activator is an alkylphenol ethoxylate.

6. The method of claim 5, wherein said alkylphenol ethoxylate is selected from the group consisting of: $C_{10}H_{21}$—$C_6H_4$—O—$(CH_2CH_2O)_7$—H; $C_{10}H_{21}$—$C_6H_4$—O—$(CH_2CH_2O)_{10}$—H; $C_{12-18}H_{25-37}$—$C_6H_4$—O—$(CH_2CH_2O)_2O$—H; $C_{12-18}H_{25-37}$—$C_6H_4$—O—$(CH_2CH_2O)_{15}$—H; or a mixture thereof.

* * * * *